(12) United States Patent
Ye et al.

(10) Patent No.: US 12,221,344 B2
(45) Date of Patent: Feb. 11, 2025

(54) INTEGRATED SMALL AND MEDIUM-SIZED NATURAL GAS STEAM REFORMING REACTOR AND REFORMING REACTION PROCESS

(71) Applicant: ALLY HI-TECH CO., LTD., Sichuan (CN)

(72) Inventors: Genyin Ye, Sichuan (CN); Yeqin Wang, Sichuan (CN)

(73) Assignee: ALLY HI-TECH CO., LTD., Chengdu (CN)

( * ) Notice: Subject to any disclaimer, the term of this patent is extended or adjusted under 35 U.S.C. 154(b) by 808 days.

(21) Appl. No.: 17/336,287

(22) Filed: Jun. 1, 2021

(65) Prior Publication Data

US 2021/0309516 A1 Oct. 7, 2021

Related U.S. Application Data

(63) Continuation of application No. PCT/CN2020/108090, filed on Aug. 10, 2020.

(30) Foreign Application Priority Data

Aug. 20, 2019 (CN) .......................... 201910770234.7

(51) Int. Cl.
*C01B 3/38* (2006.01)
*B01J 8/04* (2006.01)
(Continued)

(52) U.S. Cl.
CPC ............... *C01B 3/384* (2013.01); *B01J 8/062* (2013.01); *B01J 23/06* (2013.01); *B01J 23/34* (2013.01);
(Continued)

(58) Field of Classification Search
None
See application file for complete search history.

(56) References Cited

U.S. PATENT DOCUMENTS 4,690,690 A * 9/1987 Andrew .................. C01B 3/382
252/373
7,232,553 B2 * 6/2007 Oh ........................... C01B 3/384
422/204

FOREIGN PATENT DOCUMENTS

| CN | 101190781 A | * | 6/2008 |
| CN | 110407172 A | | 11/2019 |
| CN | 210438410 U | | 5/2020 |

OTHER PUBLICATIONS

International Search Report of PCT Patent Application No. PCT/CN2020/108090 issued on Nov. 18, 2020.

* cited by examiner

*Primary Examiner* — Jennifer A Leung (57) ABSTRACT

Disclosed herein is an integrated small and medium-sized natural gas steam reforming reactor comprising a furnace body, a combustion module located outside the furnace body, and a conversion reaction module, a steam generation and superheating module, a medium temperature shift module and a desulfurization module arranged inside the furnace body, wherein the combustion module supplies combustion flue gas into an interior of the furnace body, the interior of the furnace body is partitioned into a plurality of flue cavities by a plurality of high-temperature partition plates, and adjacent flue cavities are communicated via gaps between the high-temperature partition plates and an inner wall of the furnace body, thus forming a flue gas channel that zigzags several times; and the flue cavities and the modules arranged (Continued)

therein sequentially form a conversion unit, a steam generation unit, a medium temperature shift unit and a desulfurization unit.

2 Claims, 4 Drawing Sheets (51) Int. Cl.
*B01J 8/06* (2006.01)
*B01J 23/06* (2006.01)
*B01J 23/34* (2006.01)
*B01J 23/882* (2006.01)
*C01B 3/40* (2006.01)
*C01B 3/48* (2006.01)
*C01B 32/50* (2017.01)

(52) U.S. Cl.
CPC ............ *B01J 23/882* (2013.01); *C01B 3/382* (2013.01); *C01B 3/388* (2013.01); *C01B 3/40* (2013.01); *C01B 3/48* (2013.01); *C01B 32/50* (2017.08); B01J 2208/00504 (2013.01); B01J 2208/0053 (2013.01); C01B 2203/0233 (2013.01); C01B 2203/0283 (2013.01); C01B 2203/0816 (2013.01); C01B 2203/0894 (2013.01); C01B 2203/1052 (2013.01); C01B 2203/127 (2013.01)

INTEGRATED SMALL AND MEDIUM-SIZED NATURAL GAS STEAM REFORMING REACTOR AND REFORMING REACTION PROCESS

CROSS REFERENCE TO RELATED APPLICATIONS

The present application is a Continuation Application of PCT Application No. PCT/CN2020/108090 filed on Aug. 10, 2020, which claims the benefit of Chinese Patent Application No. 201910770234.7 filed on Aug. 20, 2019. All the above are hereby incorporated by reference in their entirety.

TECHNICAL FIELD

The present invention belongs to the technical field of hydrogen production, and particularly relates to an integrated small and medium-sized natural gas steam reforming reactor and a method for producing hydrogen by reforming reaction using the same.

BACKGROUND

About ⅔ of hydrogen is obtained by a natural gas hydrogen production in the world, and among a plurality of technologies for natural gas hydrogen production, producing hydrogen by steam reforming is one that features the most mature process and the widest application. The natural gas hydrogen production device comprises: a natural gas compression unit, a natural gas purification and desulfurization unit, a steam generation unit, a steam reforming unit, a medium temperature shift unit, a heat recovery unit and a gas purification unit. Existing mature natural gas hydrogen production processes are basically improved versions of traditional ammonia synthesis process technology; each unit for producing hydrogen is independently arranged, which is beneficial to the processing and maintenance of a large-sized hydrogen production device.

With the increasing maturity of fuel cell technology in recent years, hydrogen fuel cell vehicles have become the focus of worldwide research, the construction of hydrogen stations has been accelerated, and the demand for small-sized natural gas hydrogen production devices has been increased. Nowadays, the requirements for small and medium-sized hydrogen production devices have changed greatly. For example: 1. the device is not necessarily in a chemical industry park but possibly in a city, has high requirement on land occupation and cannot be arranged as the traditional device; 2. the device is required to be quickly started; however, it is difficult for the traditional natural gas hydrogen production device to meet the requirement since its starting time is more than 36 h; and 3. the device is highly intelligent and features unattended operation; however, the traditional natural gas device is difficult to reach the requirement because it needs routine inspection of site personnel. Therefore, the development of more compact and efficient natural gas hydrogen production devices becomes the key point of research and development of gas device manufacturers.

German WS Corporation, a company dedicated to combustor research, developed a compact steam reforming reactor based on its special combustor, which integrates a steam generator and a flue gas heat exchanger into it, and is compact in design. However, the compact steam reforming reactor does not integrate desulfurization of natural gas and the shift reaction, and meanwhile, the exhaust gas temperature is higher than 300° C., which is not conducive to the improvement of system energy efficiency.

How to effectively reduce the occupied area of the small and medium-sized natural gas hydrogen production device, lower the investment of corollary equipment, pipelines and the like and make the best use of things has become the bottleneck and core problems to be solved urgently for the small and medium-sized natural gas steam hydrogen production device.

SUMMARY

In view of the defects of the prior art, the present invention aims to provide an integrated small and medium-sized natural gas steam reforming reactor and a process for performing reforming reaction using the reforming reactor.

In order to achieve the purpose, the present invention provides an integrated small and medium-sized natural gas steam reforming reactor, which comprises:

a furnace body 1; and
a combustion module 8, wherein the combustion module 8 is arranged outside the furnace body 1 and supplies combustion flue gas to an interior of the furnace body 1;
the interior of the furnace body 1 is partitioned into a plurality of flue cavities by a plurality of high-temperature partition plates, adjacent flue cavities are communicated via gaps between the high-temperature partition plates and an inner wall of the furnace body, and the plurality of flue cavities form a flue gas channel that zigzags several times; and
the plurality of flue cavities are respectively provided with a conversion reaction module 2, a steam generation and superheating module 3, a medium temperature shift module 4 and a desulfurization module 5, thus forming a conversion unit, a steam generation unit, a shift unit and a desulfurization unit sequentially arranged along an advancing direction of the combustion flue gas.

Further, in the integrated small and medium-sized natural gas steam reforming reactor disclosed herein, the conversion reaction module 2 comprises a first-stage conversion module 2-1, a second-stage conversion module 2-2 and a heat-exchange-type conversion module 2-3; and
the conversion unit is further partitioned by high-temperature partition plates to form a first secondary flue cavity 1-1 for accommodating the first-stage conversion module 2-1, a second secondary flue cavity 1-2 for accommodating the second-stage conversion module 2-2 and a third secondary flue cavity 1-3 for accommodating the heat-exchange-type conversion module 2-3, and the first secondary flue cavity 1-1, the second secondary flue cavity 1-2 and the third secondary flue cavity 1-3 are communicated to form a flue gas channel that zigzags several times.

Further, in the integrated small and medium-sized natural gas steam reforming reactor disclosed herein, the heat-exchange-type conversion module 2-3 comprises a conversion cavity 31 and a heat exchange cavity 32; and
the desulfurization module 5 and the steam generation and superheating module 3 are each directly or indirectly connected to the conversion cavity 31 of the heat-exchange-type conversion module 2-3, and the conversion cavity 31 of the heat-exchange-type conversion module 2-3, the first-stage conversion module 2-1, the second-stage conversion module 2-2, the heat exchange cavity 32 of the heat-exchange-type conversion module 2-3 and the medium temperature shift module 4 are sequentially connected through tubes.

Further, in the integrated small and medium-sized natural gas steam reforming reactor disclosed herein, the first-stage conversion module 2-1 is composed of 1 to 6 first-stage conversion tubes arranged around a burner of the combustion module 8 or on one side of the burner, and a plurality of first-stage conversion tubes are connected in parallel or in series when the number of the first-stage conversion tubes is more than 1.

Further, in the integrated small and medium-sized natural gas steam reforming reactor disclosed herein, the second-stage conversion module 2-2 is composed of 1 to 6 second-stage conversion tubes, and a plurality of second-stage conversion tubes are connected in parallel or in series when the number of the second-stage conversion tubes is more than 1.

Further, in the integrated small and medium-sized natural gas steam reforming reactor disclosed herein, a flow direction of the combustion flue gas in the second secondary flue cavity 1-2 is opposite to that of reaction gas in the second-stage conversion tube.

Further, in the integrated small and medium-sized natural gas steam reforming reactor disclosed herein, the first-stage conversion tube and/or the second-stage conversion tube is structurally a conversion tube with a central tube, a catalyst is filled in a cavity between a tube wall of the conversion tube and an outer wall of the central tube, and the reaction gas enters the cavity filled with the catalyst from an upper part of the conversion tube, then flows into the central tube at an bottom of the conversion tube, and then is led out of the conversion tube.

Further, in the integrated small and medium-sized natural gas steam reforming reactor disclosed herein, the conversion cavity 31 in the heat-exchange-type conversion module 2-3 is filled with catalyst; and gas flowing in the heat exchange cavity 32 comes from outlet gas of the second-stage conversion module 2-2, and the heat exchange cavity 32 provides heat for the reaction gas flowing in the conversion cavity 31 by using the outlet gas from the second-stage conversion module 2-2 and the combustion flue gas in the third secondary flue cavity 1-3.

Further, in the integrated small and medium-sized natural gas steam reforming reactor disclosed herein, the medium temperature shift module 4 is structurally a medium temperature shift reaction tube, and gas from the heat exchange cavity 32 of the heat-exchange-type conversion module 2-3 enters into the medium temperature shift reaction tube and then undergoes a medium temperature shift reaction in the presence of a medium temperature shift catalyst to generate medium temperature shift gas; and the medium temperature shift gas is discharged from a bottom of the medium temperature shift reaction tube, or a medium temperature shift central tube is arranged inside the medium temperature shift reaction tube, and the medium temperature shift gas is collected and led out through the medium temperature shift central tube.

Further, in the integrated small and medium-sized natural gas steam reforming reactor disclosed herein, the shift unit further comprises a first additional heat exchanger 44; the first additional heat exchanger 44 is arranged in a flue cavity where the medium temperature shift module 4 is located, or the first additional heat exchanger is arranged inside the medium temperature shift module 4; and a fluid in the first additional heat exchanger 44 is reaction feed natural gas or feed water for reforming reaction, and preferably feed natural gas.

Further, in the integrated small and medium-sized natural gas steam reforming reactor disclosed herein, the steam generation and superheating module 3 is composed of heat exchange tubes and the heat exchange tubes are in the form of fins or light tubes, and preferably fins.

Further, in the integrated small and medium-sized natural gas steam reforming reactor disclosed herein, the catalyst filled in the desulfurization module 5 is a Co—Mo, Mn or ZnO based catalyst.

Further, in the integrated small and medium-sized natural gas steam reforming reactor disclosed herein, positions of the desulfurization unit and the shift unit are interchanged, so that at least the conversion unit, the steam generation unit, the desulfurization unit and the shift unit are sequentially arranged in the furnace body 1 along the advancing direction of the combustion flue gas.

Further, in the integrated small and medium-sized natural gas steam reforming reactor disclosed herein, the desulfurization module 5 is removed or the desulfurization module 5 is moved to the outside of the furnace body 1.

Further, in the integrated small and medium-sized natural gas steam reforming reactor disclosed herein, the high-temperature partition plate between the medium temperature shift module 4 and the desulfurization module 5 is removed, so that the medium temperature shift module 4 and the desulfurization module 5 are in the same flue cavity.

Further, the integrated small and medium-sized natural gas steam reforming reactor disclosed herein further comprises a mixer 7 located outside the furnace body 1, the desulfurization module 5 and the steam generation and superheating module 3 are each connected to the mixer 7, and the mixer 7 is further connected to the conversion cavity 31 of the heat-exchange-type conversion module 2-3.

Further, in the integrated small and medium-sized natural gas steam reforming reactor disclosed herein, a second additional heat exchanger is arranged outside a flue cavity where the heat-exchange-type conversion module 2-3 is located, and the second additional heat exchanger enables heat exchange between outlet gas of the heat exchange cavity 32 of the heat-exchange-type conversion module 2-3 and the reaction gas flowing in the mixer 7.

Further, the integrated small and medium-sized natural gas steam reforming reactor disclosed herein further comprises a flue gas heat exchange module 6; the flue gas heat exchange module 6 is arranged inside the furnace body 1 and located in a flue cavity at a tail part of a combustion flue gas flow, and the flue gas heat exchange module 6 and the flue cavity where the flue gas heat exchange module is located form a flue gas heat exchange unit; and preferably, the flue gas heat exchange module 6 is structurally a finned heat exchanger, a light tube heat exchanger or a flat plate heat exchanger.

The present disclosure further provides a process for performing reforming reaction using the integrated small and medium-sized natural gas steam reforming reactor, which comprises the following steps:

S1: conveying feed natural gas into the integrated small and medium-sized natural gas steam reforming reactor and burning a part of the feed natural gas, as fuel natural gas, in the combustion module 8 to at least heat the conversion unit, the steam generation unit, the shift unit and the desulfurization unit;

S2: conveying the other part of the feed natural gas, as the reaction feed natural gas, into the desulfurization unit for desulfurization, and conveying the feed water into the steam generation unit to produce superheated steam;

S3: conveying the desulfurized reaction feed natural gas and the superheated steam into the conversion unit according to a set proportion, and allowing the desulfurized reaction feed natural gas and the superheated steam to undergo conversion reaction in the conversion unit to obtain conversion gas;

S4: conveying the conversion gas into the shift unit, and allowing the conversion gas to undergo CO shift reaction in the shift unit to obtain medium temperature shift gas containing hydrogen; and S5: leading the medium temperature shift gas out of the integrated small and medium-sized natural gas steam reforming reaction device, and conveying the medium temperature shift gas to a downstream working section.

The technical solution of the present disclosure realizes one or more of the following beneficial technical effects:

1. the device highly integrates such modules as desulfurization module and shift module in the furnace body, which effectively reduces the volume and the occupied area of the device, and thus reduces the investment in corollary equipment, pipelines and the like;
2. heat exchange modes among the modules are skillfully set according to the reaction characteristics of all steps of the reforming reaction, so that the temperature of each module is suitable for the function of the module, the heat loss in the reaction process is small, the energy efficiency of the system is high, and the conversion rate of the reforming reaction is high;
3. the integrated small and medium-sized natural gas steam reforming reaction device disclosed herein can serve as a hot standby machine; the temperature of the device can be maintained through the small-load operation of the combustor during the short-time shutdown of the device, and the device can be in an operation state quickly when started next time, so that the service efficiency of the device is improved, and the start-stop time of the device is shortened;
4. the flue gas channel in the integrated small and medium-sized natural gas steam reforming reaction device disclosed herein can guide high-temperature combustion flue gas to flow in zigzags, so that the temperature-rise process of the device is remarkably simplified; and
5. the steam generation and superheating module is integrated in the reforming reaction device and can automatically generate steam when the reforming reaction device reaches a set temperature after being started, and no additional starting steam is needed and no steam is discharged during this process, and thus the energy consumption is reduced and the device is simple in control.

BRIEF DESCRIPTION OF THE DRAWINGS

In order to more clearly illustrate the embodiments of the present application or the technical solutions in the prior art, the drawings used in the embodiments or description of prior art will be briefly described below. It is obvious that the drawings in the following description are only some embodiments of the present application, and based on these drawings, other drawings can be obtained by those skilled in the art without creative efforts.

DETAILED DESCRIPTION

In the following, only certain exemplary embodiments are briefly described. As those skilled in the art would realize, the described embodiments may be modified in various different ways without departing from the spirit or scope of the present invention. Accordingly, the drawings and description are to be construed as illustrative in nature but not restrictive.

In the description of the present invention, it is to be understood that directions or positional relationships indicated by terms "upper", "lower", "top", "bottom", "inside", "outside" and the like are those shown based on the accompanying drawings, and are merely intended to facilitate and simplify description rather than indicate or imply that the indicated device or element must have a specific direction and must be configured and operated according to the specific direction. Therefore, these directions or positional relationships should not be construed as limiting the present invention.

In the present invention, unless otherwise clearly specified and defined, the terms "arrange", "link", "connect" and the like should be comprehended in its broad sense. For example, "connect" may be "fixedly connect", "detachably connect" or "integrally connected as one"; "mechanically connect", "electrically connect" or "communicate"; "directly interconnect" or "indirectly interconnect through an intermediate"; or "the communication between the interiors of two elements" or "the interaction between two elements". For those of ordinary skill in the art, the specific meanings of the aforementioned terms in the present invention can be understood according to specific conditions.

Embodiments of the present invention will be described in detail below with reference to the accompanying drawings.

Figure 1:
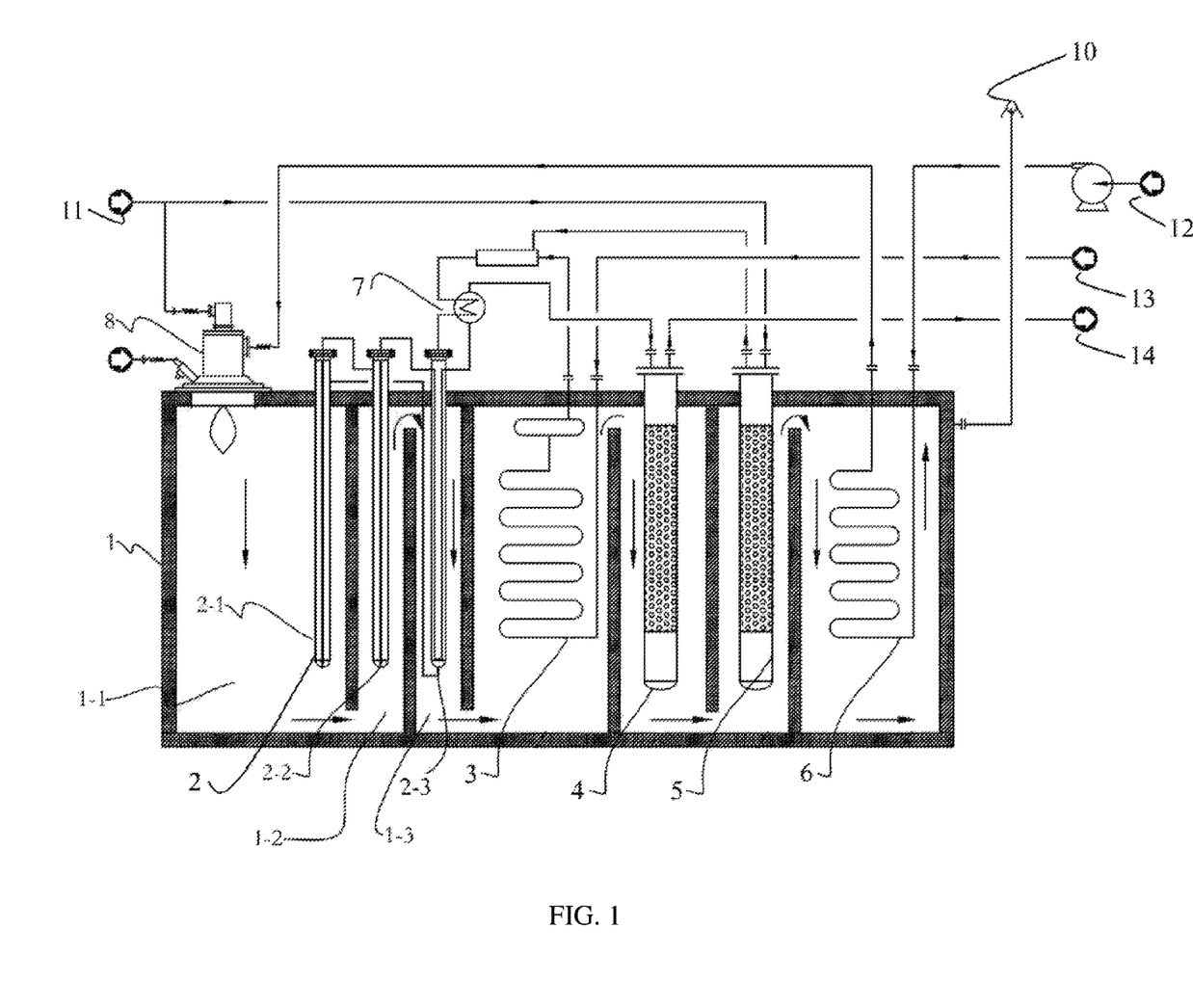
FIG. 1 is a schematic structural diagram of an integrated small and medium-sized natural gas steam reforming reactor.

Overall structure of integrated small and medium-sized natural gas steam reforming reactor:

The present invention provides an integrated small and medium-sized natural gas steam reforming reactor, which integrates a plurality of functional working sections into a whole and can effectively reduce the volume and the occupied area of the device, thereby reducing the investment of corollary equipment, pipelines and the like. As shown in FIG. 1, in terms of overall structure, the integrated small and medium-sized natural gas steam reforming reactor disclosed herein comprises:

a furnace body 1; and a combustion module 8, wherein the combustion module 8 is installed at the outer top of the furnace body 1 and supplies high-temperature combustion flue gas to an interior of the furnace body 1 by combustion of fuel natural gas.

A plurality of high-temperature partition plates are arranged inside the furnace body 1, wherein some high-temperature partition plates are connected to a top plate of the furnace body 1 while distanced from a bottom plate of the furnace body 1 by a gap (such high-temperature partition plates are called as upper partition plates), and the high-temperature partition plates adjacent to the upper partition plates are connected to the bottom plate of the furnace body 1 while distanced from the top plate of the furnace body 1 by a gap (such high-temperature partition plates are called as lower partition plates), so that a plurality of flue cavities are formed in the furnace body 1 by the high-temperature partition plates, and the plurality of flue cavities form a flue gas channel that zigzags several times.

Each flue cavity is provided with a specific functional module, and the flue cavities and the functional modules contained therein form a conversion unit, a steam generation unit, a shift unit and a desulfurization unit sequentially arranged along an advancing direction of the combustion flue gas. Preferably, along the advancing direction of the combustion flue gas, a flue gas heat exchange unit can be further arranged downstream of the desulfurization unit, namely at a tail part of the combustion flue gas flow. A flue gas outlet 10 is provided on one side of the furnace body 1 that is far away from the combustion module 8, so that the combustion flue gas can be discharged from the furnace body 1.

The feed natural gas enters the system from a feed natural gas inlet 11 and then is divided into two parts which are respectively used as reaction feed natural gas for reforming reaction and fuel natural gas for combustion of the combustion module. The reaction feed natural gas enters the desulfurization unit; feed water enters the system from a feed water inlet 13 and is then converted into superheated steam in the steam generation unit; the desulfurized reaction feed natural gas and the superheated steam, as reforming reaction feed gas, flow through the conversion unit and the shift unit sequentially to react accordingly, then flow out of the shift unit, and then are conveyed to a downstream working section of the reforming reaction device via a synthesis gas outlet 14.

The flue gas channel can guide the high-temperature combustion flue gas to flow in zigzags, so as to supply heat for the units inside the furnace body and allow each unit to reach its suitable operating temperature. This temperature-rise process is remarkably simplified compared with that of a traditional reforming reaction device, and the time for starting the device is greatly reduced.

The main structures of the integrated small and medium-sized natural gas steam reforming reactor are described below.

(A) Furnace Body

The material of the furnace body 1 can be properly selected according to actual needs, and the furnace body is usually a steel structure furnace body. The furnace body is usually lined with a refractory layer.

(B) Combustion Module

The combustion module 8 is installed at an outer top of the furnace body 1. The combustion module injects both the fuel natural gas and air into the furnace body for combustion, and the high-temperature combustion flue gas resulting from combustion flows inside the furnace body along the flue gas channel that zigzags several times, thus providing required heat of reaction for the device in the furnace body.

(C) Mixer

The desulfurized reaction feed natural gas and the superheated steam may be directly introduced into the conversion unit as the reforming reaction feed gas. However, in a preferred embodiment, a mixer 7 may be further arranged outside the furnace body 1 for mixing the desulfurized reaction feed natural gas and the superheated steam and then feeding the mixed reforming reaction feed gas into the conversion unit.

(D) Conversion Unit

The conversion unit is arranged inside the furnace body and close to the combustion module. The conversion unit is provided with a conversion reaction module therein. Specifically, the conversion reaction module may comprise a first-stage conversion module 2-1, a second-stage conversion module 2-2 and a heat-exchange-type conversion module 2-3 arranged along the advancing direction of the flue gas, and preferably, the first-stage conversion module 2-1, the second-stage conversion module 2-2 and the heat-exchange-type conversion module 2-3 are further partitioned by an upper partition plate and a lower partition plate.

The heat-exchange-type conversion module 2-3 comprises a conversion cavity 31 and a heat exchange cavity 32. The reforming reaction feed gas enters the conversion cavity 31 of the heat-exchange-type conversion module 2-3, then sequentially flows through the first-stage conversion module 2-1 and the second-stage conversion module 2-2, then enters the heat exchange cavity 32 of the heat-exchange-type conversion module 2-3, and finally flows out of the heat exchange cavity 32 of the heat-exchange-type conversion module 2-3 and flows to the subsequent shift unit.

In each module of the conversion unit, the main reaction for the reaction gas is conversion reaction:

$$CH_4+H_2O \rightarrow CO+3H_2-Q \text{ (endothermic)}$$

Each conversion reaction module in the conversion unit is explained below.

(D-1) Heat-Exchange-Type Conversion Module

Figure 2:
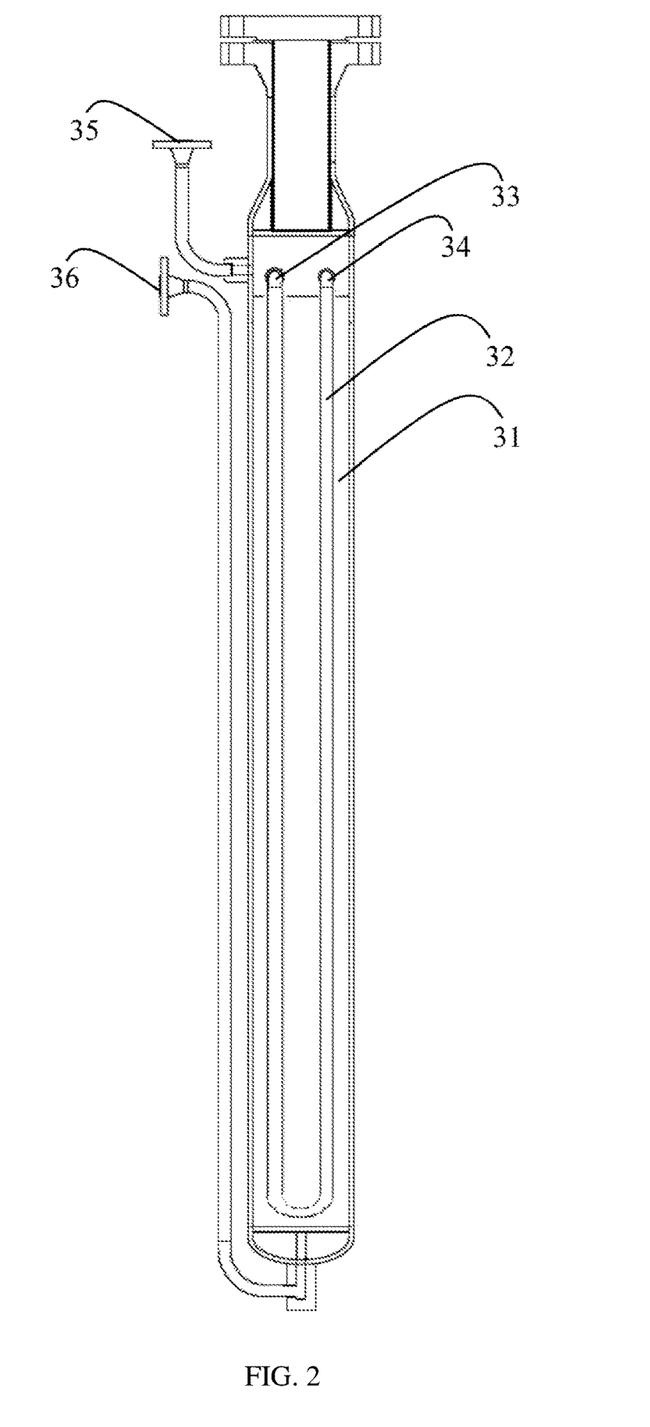
FIG. 2 is a schematic structural diagram of an exemplary heat-exchange-type conversion module.

As shown in FIG. 2, the heat-exchange-type conversion module 2-3 comprises a conversion cavity 31 and a heat exchange cavity 32. The heat exchange cavity 32 is located inside the heat-exchange-type conversion module 2-3, and the conversion cavity 31 is located outside the heat exchange cavity and inside an outer wall of the heat-exchange-type conversion module. Preferably, the heat exchange cavity 32 is in the form of a heat exchange coil, which is helpful for sufficient heat exchange between the high-temperature gas in the heat exchange cavity and the gas in the conversion cavity. Preferably, the outer wall of the heat-exchange-type conversion module is wound with a heat exchange coil, thus facilitating the heat exchange between the high-temperature gas flowing in the flue cavities outside the heat-exchange-type conversion module and the gas in the conversion cavity.

The high-temperature gas entering the heat exchange cavity 32 from a gas inlet 33 of the heat exchange cavity comes from outlet gas of the second-stage conversion tube 2-2, and this part of high-temperature gas can supply heat for the conversion cavity through heat exchange. After heat exchange, the high-temperature gas flows out from a gas outlet 34 of the heat exchange cavity.

The conversion cavity 31 is filled with a catalyst, and the reaction feed gas enters the conversion cavity 31 from a gas inlet 35 of the conversion cavity to undergo pre-conversion reaction in the presence of the catalyst. The heat required by the reaction of the gas in the conversion cavity is partially from the high-temperature gas in the heat exchange cavity, and partially from the high-temperature flue gas flowing in the flue cavities outside the heat-exchange-type conversion module. The reaction feed gas flows out from a gas outlet 36 of the conversion cavity after reacting in the conversion cavity 31.

In the heat-exchange-type conversion module, through the heat exchange between the conversion cavity and the heat exchange cavity, the waste heat of the gas in the heat exchange cavity is utilized to heat the gas in the conversion cavity so as to facilitate endothermic conversion reaction, and meanwhile the gas in the heat exchange cavity is cooled down to an appropriate extent so as to facilitate its exothermic shift reaction later in the shift unit.

(D-2) First-Stage Conversion Module

The first-stage conversion module 2-1 is adjacent to the combustion module and mainly utilizes the radiant heat transfer of the burning flame.

The first-stage conversion module 2-1 may be composed of a single first-stage conversion tube, or may be composed of a plurality of first-stage conversion tubes connected in parallel or in series. The plurality of first-stage conversion tubes may be arranged around a burner of the combustion module or on one side of the burner.

Figure 3:
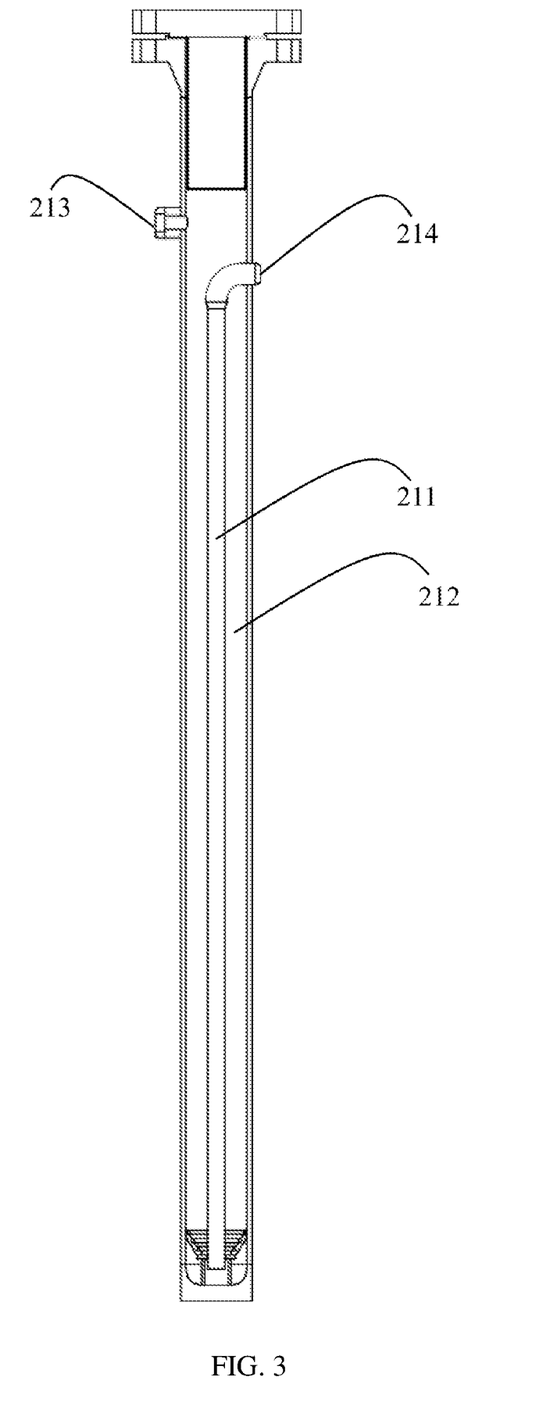
FIG. 3 is a schematic structural diagram of an exemplary first-stage conversion module.

Reaction gas entering the first-stage conversion tube comes from the conversion cavity 31 of the heat-exchange-type conversion module 2-3. Preferably, as shown in FIG. 3, an interior of the first-stage conversion tube may have a central tube 211, a catalyst is filled in an empty cavity 212 between an outer wall of the first-stage conversion tube and the central tube 211, reaction gas enters the empty cavity 212 filled with the catalyst from a first-stage conversion gas inlet 213 at an upper part of the first-stage conversion tube and reacts when it is in contact with the catalyst, and the reacted gas reaches a bottom of the first-stage conversion tube, and then is collected by the central tube 211 and led out of the first-stage conversion tube from a first-stage conversion gas outlet 214.

(D-3) Second-Stage Conversion Module

The second-stage conversion module 2-2 is located downstream of the first-stage conversion module 2-1 along the advancing direction of the combustion flue gas. The heating mode of the second-stage conversion module 2-2 is radiation heat transfer and convection heat transfer of the high-temperature combustion flue gas flowing in the flue cavities.

The second-stage conversion module 2-2 may be composed of a single second-stage conversion tube, or may be composed of a plurality of second-stage conversion tubes connected in parallel or in series.

Reaction gas entering the second-stage conversion tube comes from outlet gas of the first-stage conversion tube. Preferably, similar to the first-stage conversion tube, an interior of the second-stage conversion tube may have a central tube structure, a catalyst is filled in an empty cavity between an outer wall of the second-stage conversion tube and the central tube, reaction gas enters the cavity filled with the catalyst from an upper part of the second-stage conversion tube and reacts when it is in contact with the catalyst, and then the reacted gas reaches a bottom of the second-stage conversion tube. After being collected by the central tube and led out of the second-stage conversion tube, the reacted gas enters the heat exchange cavity 32 of the heat-exchange-type conversion module 2-3.

Preferably, in a flue cavity where the second-stage conversion tube is located, the combustion flue gas flows from bottom to top, while in the second-stage conversion tube, the reaction gas flows from top to bottom and thus the reaction takes place from top to bottom. The gas flows inside and outside the second-stage conversion tube form reverse temperature gradient to raise heat transfer efficiency, and the high-temperature flue gas heats the gas in the last stage of the reaction to promote chemical equilibrium toward the reaction product and thus raise conversion rate.

(E) Steam Generation Unit

The steam generation unit comprises a steam generation and superheating module 3. The steam generation and superheating module 3 is heated by combustion flue gas flowing in a flue cavity where the steam generation and superheating module is located, so that the feed water entering the module is heated, and superheated steam is generated for subsequent reaction. The steam generation and superheating module 3 is located in the furnace body 1 and can automatically generate steam when the reforming reaction device reaches a set temperature after being started, and no additional starting steam is needed and no steam is discharged during this process, and thus energy consumption is reduced, the device is simple in control and the occupied space of the reforming reaction device is further saved.

Preferably, the steam generation and superheating module 3 is composed of heat exchange tubes, which can be in the form of fins or light tubes, and preferably fins.

(F) Shift Unit

The main reaction in the shift unit is:

$CO+H_2O \rightarrow CO_2+H_2+Q$ (exothermic)

The CO shift reaction is exothermic, and low temperature is favorable for shift equilibrium.

Figure 4:
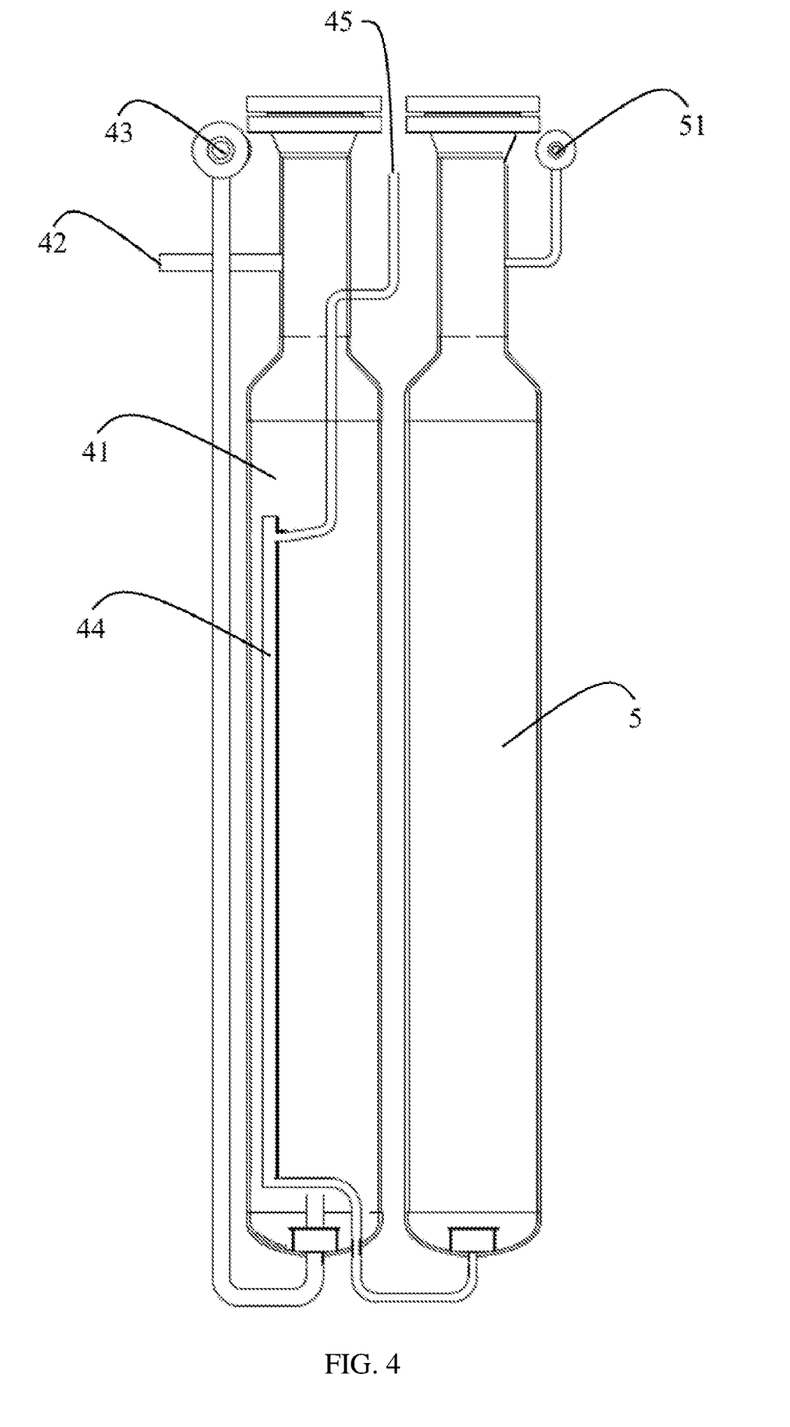
FIG. 4 is a schematic structural diagram of an exemplary medium temperature shift module and desulfurization module.

The shift unit comprises a medium temperature shift module 4. The basic structure of the medium temperature shift module 4 is a medium temperature shift reaction tube. As shown in FIG. 4, the medium temperature shift reaction tube comprises a medium temperature shift catalyst cavity 41 for loading a medium temperature shift catalyst, and the gas from the heat exchange cavity of the heat-exchange-type conversion module enters the medium temperature shift module from the medium temperature shift gas inlet 42, flows through the medium temperature shift catalyst cavity 41, and undergoes shift reaction in the presence of the medium temperature shift catalyst. The shifted gas can be collected at a bottom of the medium temperature shift reaction tube and led out to a medium temperature shift gas outlet 43, or a central tube can be arranged inside the medium temperature shift reaction tube, and the shifted gas is collected and led out through the central tube.

In a preferred embodiment, a first additional heat exchanger 44 is additionally arranged. The first additional heat exchanger 44 can be arranged in a flue cavity where the medium temperature shift reaction tube is located, but more preferably the first additional heat exchanger 44 is arranged inside the medium temperature shift reaction tube. For example, the first additional heat exchanger 44 is arranged inside the medium temperature shift catalyst cavity 41. A fluid flowing in the first additional heat exchanger 44 may be reaction feed natural gas or feed water for reforming reaction, and preferably the reaction feed natural gas. For example, in the case where the fluid is the reaction feed natural gas: the feed natural gas enters the system from the feed natural gas inlet 11 and then is divided into two parts; one part, as the reaction feed natural gas, enters the first additional heat exchanger 44 from a first additional heat exchanger inlet 45, heat released by CO shift reaction is used to preheat the reaction feed natural gas through heat exchange between fluids inside and outside the first additional heat exchanger 44, and the preheated reaction feed natural gas is then fed to a desulfurization module 5. Alternatively, in the case where the fluid is the feed water: after entering the system from the feed water inlet 13, the feed water enters the first additional heat exchanger 44 from the first additional heat exchanger inlet 45, heat released by CO shift reaction is used to preheat the feed water through heat exchange between fluids inside and outside the first additional heat exchanger 44, and the preheated feed water is then fed to the steam generation and superheating module 3. Thus it can be seen that by additionally arranging the first additional heat exchanger 44, the released heat of the CO shift reaction is utilized. Meanwhile, the heat released by the reaction is conducted away in time, so that the exothermic CO shift reaction is facilitated to be carried out rightwards.

(G) Desulfurization Unit

The desulfurization unit comprises the desulfurization module 5, which is used for desulfurizing the feed natural gas for the subsequent reaction. The desulfurization module 5 may be filled with a desired desulfurization catalyst, typically a Co—Mo, Mn or ZnO based catalyst, according to the actual composition of the feed natural gas, or other catalysts may be used according to actual needs. The desulfurized feed natural gas is led out from a desulfurization module outlet 51 and can be directly conveyed to the conversion cavity 31 of the heat-exchange-type conversion module 2-3, or, in the case that the mixer 7 is additionally arranged, the desulfurized feed gas can be conveyed to the mixer 7, mixed with the superheated steam and then conveyed to the conversion cavity 31 of the heat-exchange-type conversion module 2-3.

(H) Flue Gas Heat Exchange Unit

In a preferred embodiment, a flue gas heat exchange unit is further arranged, and the flue gas heat exchange unit comprises a flue gas heat exchange module 6. The flue gas heat exchange module 6 can be arranged inside the furnace body 1, specifically located at a tail part of the combustion flue gas flow, in a flue cavity at the end of the furnace body. Alternatively, the flue gas heat exchange module 6 can also be arranged outside the furnace body. Air flows into the flue gas heat exchange module from an air inlet 12, and then is subjected to heat exchange with the combustion flue gas outside the flue gas heat exchange module. The air is heated by waste heat of the combustion flue gas and then conveyed to the combustion module, so that the combustion efficiency of the combustion module can be improved.

In terms of the specific structure, the flue gas heat exchange module 6 may be a finned heat exchanger, a light tube heat exchanger, a flat plate heat exchanger or the like, and preferably a flat plate heat exchanger or a finned heat exchanger.

Described above is a typical structure of the integrated small and medium-sized natural gas steam reforming reaction device disclosed herein. In addition, some changes may also be made to the technical solutions of the present disclosure. Some optional changes are provided below.

In the case that the feed natural gas reaches the standard with regard to the sulfur content and can be used for reforming reaction without desulfurization, the desulfurization module can be removed, and the reaction feed natural gas is directly introduced into the conversion unit to react with the superheated steam or is mixed with the superheated steam through the mixer and then is fed into the conversion unit.

For certain feed natural gas with special sulfur components, the desulfurization module can be moved to the outside of the furnace body of the integrated reforming reactor due to different conditions required in desulfurization reaction.

In the case that the desulfurization unit is arranged inside the furnace body, the positions of the desulfurization unit and the conversion unit can be exchanged, namely, at least the conversion unit, the steam generation unit, the desulfurization unit and the shift unit are sequentially arranged in the furnace body along the advancing direction of the combustion flue gas; and a flue gas heat exchange unit, if arranged, is located behind the shift unit.

According to actual conditions, the high-temperature partition plate between the medium temperature shift module and the desulfurization module can be shortened or removed, so that a channel between the flue cavity where the medium temperature shift module is located and the flue cavity where the desulfurization module is located is widened, and even the medium temperature shift module and the desulfurization module are located in the same flue cavity. By means of the adjustment, the flow speed of the combustion flue gas in the flue cavities can be changed to meet the specific requirements of actual production.

According to actual conditions, if it is difficult for the gas to reach a specified temperature after heat exchange as a result of the limited space of the flue cavity where the heat-exchange-type conversion module is located, a second additional heat exchanger can be further arranged. The second additional heat exchanger may be arranged outside the flue cavity where the heat-exchange-type conversion module is located. The second additional heat exchanger enables heat exchange between the outlet gas of the heat exchange cavity of the heat-exchange-type conversion module and the reaction gas (mixed gas of the desulfurized reaction feed natural gas and the superheated steam), so that the temperature of the outlet gas of the heat exchange cavity of the heat-exchange-type conversion module is reduced to meet the requirement of subsequent CO shift reaction, and meanwhile, the reaction gas is heated, which is beneficial to the conversion reaction of the reaction gas.

Described above is a typical structure of the integrated small and medium-sized natural gas steam reforming reaction device disclosed herein. The protection scope of the present invention is not limited thereto, and any changes or substitutions that can be easily made by those skilled in the art within the technical scope disclosed herein also fall within the protection scope of the present invention.

The integrated small and medium-sized natural gas steam reforming reaction device disclosed herein highly integrates all functional modules of reforming reaction. On one hand, the volume and the occupied area of the device is effectively reduced, thereby reducing the investment in corollary equipment, pipelines and the like, and on the other hand, heat exchange modes among the modules are skillfully set according to the reaction characteristics of all steps of the reforming reaction, so that the temperature of each module is suitable for the function of the module, the heat loss in the reaction process is small, the energy efficiency of the system is high, and the conversion rate of the reforming reaction is high. In addition, the integrated small and medium-sized natural gas steam reforming reaction device disclosed herein can serve as a hot standby machine. The temperature of the hot-work equipment of the device can be controlled near the temperature of a working point through the small-load operation of the combustion module during the short-time shutdown of the device, and the reactive materials can be quickly introduced when the device is started next time, so that the service efficiency of the device is improved, and the start-stop time of the device is shortened.

The present disclosure also provides a process for preparing hydrogen using the integrated small and medium-sized natural gas steam reforming reaction device, which comprises the following steps:

S1: feeding the feed natural gas into the device from the feed natural gas inlet 11, and burning a part of the feed natural gas, as the fuel natural gas, in the combustion module 8 to heat the conversion unit, the steam generation unit, the desulfurization unit, the shift unit and the flue gas heat exchange unit (if any) in the furnace body;

S2: conveying the other part of the feed natural gas, as the reaction feed natural gas, into the desulfurization unit for desulfurization (the desulfurization procedure can be omitted if the sulfur content of the feed natural gas reaches the standard), and meanwhile conveying the feed water into the steam generation unit to produce the superheated steam;

S3: conveying the desulfurized reaction feed natural gas and the superheated steam into the conversion unit (being directly conveyed into the conversion unit or being conveyed into the conversion unit after mixing by the mixer) according to a set proportion, and allowing the desulfurized reaction feed natural gas and the superheated steam to sequentially flow through the conversion cavity 31 of the heat-exchange-type conversion module 2-3, the first-stage conversion tube 2-1, the second-stage conversion tube 2-2 and the heat exchange cavity 32 of the heat-exchange-type conversion module 2-3, and to undergo conversion reaction in the conversion unit to obtain conversion gas:

$CH_4 + H_2O \rightarrow CO + 3H_2 - Q$ (endothermic);

S4: conveying the conversion gas into the shift unit, and allowing the conversion gas to undergo CO shift reaction in the shift unit to obtain medium temperature shift gas:

$CO + H_2O \rightarrow CO_2 + H_2 + Q$ (exothermic); and

S5: leading the medium temperature shift gas out of the integrated small and medium-sized natural gas steam reforming reaction device, and conveying the medium temperature shift gas to a downstream working section.

APPLICATION EXAMPLE

200 Nm³/h Integrated Natural Gas Steam Reforming Hydrogen Production Reactor

The feed natural gas comprises the following components: $CH_4$, 96.2%; $C_2H_6$, 2.87%; $C_3H_8$, 0.514%; $C_4H_{10}$, 0.21%; $N_2$, 0.18%; $CO_2$, 0.0018%; $H_2S$, <5 mg/Nm³; and the pressure of the feed gas is 2.5 MPag.

The device does not need a compressor supercharging system because the pressure of the feed gas has reached the required pressure of the system. The feed gas is from outside the battery limit and divided into two parts, wherein one part of the feed gas is introduced into the combustion module of the integrated steam reforming hydrogen production reactor to be used as combustion heat supply, and the other part of the feed gas, after being depressurized to 1.9 MPag, enters the flue cavity of the integrated steam reforming hydrogen production reactor and reaches 350° C. after heat exchange, and then enters the desulfurization unit where the feed gas is desulfurized so that the content of $H_2S$ in it is reduced to below 0.1 ppm. Desalted water from outside the battery limit is pressurized to 1.9 MPag by a booster pump, metered, and then introduced into the steam generation unit to generate superheated steam at temperature of 250-300° C., which is then mixed with the natural gas and introduced into the conversion unit.

In the heat-exchange-type conversion module of the conversion unit, $CH_4$ and other alkane components in the natural gas undergo pre-conversion reaction with the steam in the conversion cavity to generate gases such as $H_2$, CO and $CO_2$; the conversion gas from the second-stage conversion module provides heat for conversion reaction through the heat exchange coil in the conversion cavity of the heat-exchange-type conversion module; the temperature of the conversion gas is about 450-550° C., and through heat exchange, the temperature of the mixed gas in the conversion cavity of the heat-exchange-type conversion module is raised to 400-500° C., while the temperature of the conversion gas from the second-stage conversion module is reduced to 280-350° C. The heat source for pre-conversion comes from the high-temperature synthesis gas flowing in the heat exchange cavity of the heat-exchange-type conversion module and the high-temperature flue gas in the flue cavity.

The pre-converted gas enters the first-stage conversion module of the conversion unit. The first-stage conversion module is composed of four first-stage conversion tubes arranged around a combustor, and every two conversion tubes are connected in series to form a group, and the groups are connected in parallel. The reaction gas passing through the first-stage conversion module enters the second-stage conversion module composed of two second-stage conversion tubes connected in parallel. The synthesis gas is discharged from the second-stage conversion module and then enters the heat exchange cavity of the heat-exchange-type conversion module, and its temperature is 280-350° C. after heat exchange; and the synthesis gas is discharged from the heat-exchange-type conversion module and then enters the medium temperature shift module where CO in the reaction gas and $H_2O$ further react to generate $H_2$ and $CO_2$. As the medium temperature shift unit is arranged inside the flue cavity, part of the heat generated by the medium temperature shift reaction is transferred to the flue gas, and the temperature of the medium temperature shift module is 350° C., which is lower than the temperature of an adiabatic bed, and thus the conversion rate of CO is further improved. After being discharged from the medium temperature shift module, the conversion gas enters a subsequent working section. The combustion flue gas enters the flue gas heat exchange module after passing through the medium temperature shift module and the desulfurization module, and its temperature is 300-350° C. In the flue gas heat exchange module, the heat of the flue gas is transferred to combustion air, and through heat exchange, the temperature of the flue gas discharged is 120-150° C. while the temperature of the combustion air is 230-280° C. Thus, the working procedures of the natural gas steam reforming unit of the integrated steam reforming reactor are completed.

When the system is started, there's no need to heat the medium temperature shift unit and the desulfurization unit with $N_2$ since they are arranged in the flue cavities and heated by the high-temperature gas in the flue cavities. If the device is shut down for a short time, the heat standby function can be realized simply by lowering the combustion power of the combustor and adjusting the temperature in the integrated steam reforming reactor to be below 500° C.

What has been described above is only the detailed description of the present invention, and the protection scope of the present invention is not limited thereto. Any changes or substitutions that can be easily made by those skilled in the art within the technical scope disclosed herein also fall within the protection scope of the present invention. Therefore, the protection scope stated in the claims shall prevail with regard to the protection scope of the present invention.

The invention claimed is:

1. An integrated natural gas steam reforming reactor, comprising:
   a furnace body (1); and
   a combustion module (8), wherein the combustion module (8) is located outside the furnace body (1) and supplies combustion flue gas to the furnace body (1);
   the furnace body (1) is partitioned into a plurality of flue cavities by a plurality of high-temperature partition plates, adjacent flue cavities communicated via gaps between the high-temperature partition plates and an inner wall of the furnace body, and the plurality of flue cavities form a flue gas channel that zigzags multiple times; and the plurality of flue cavities are respectively provided with a conversion reaction module (2), a steam generation and superheating module (3) and a combination of a medium temperature shift module (4) and a desulfurization module (5), thus forming a conversion unit, a steam generation unit and a combination of a shift unit and a desulfurization unit sequentially arranged along an advancing direction of the combustion flue gas;

wherein the conversion reaction module (2) comprises a first-stage conversion module (2-1), a second-stage conversion module (2-2) and a heat-exchange conversion module (2-3); and the conversion unit is further partitioned by high-temperature partition plates to form a first secondary flue cavity (1-1) for accommodating the first-stage conversion module (2-1), a second secondary flue cavity (1-2) for accommodating the second-stage conversion module (2-2) and a third secondary flue cavity (1-3) for accommodating the heat-exchange conversion module (2-3), and the first secondary flue cavity (1-1), the second secondary flue cavity (1-2) and the third secondary flue cavity (1-3) are communicated to form the flue gas channel that zigzags multiple times.

2. An integrated natural gas steam reforming reactor, comprising:

a furnace body (1); and a combustion module (8), wherein the combustion module (8) is located outside the furnace body (1) and supplies combustion flue gas to the furnace body (1);

the furnace body (1) is partitioned into a plurality of flue cavities by a plurality of high-temperature partition plates, adjacent flue cavities communicated via gaps between the high-temperature partition plates and an inner wall of the furnace body, and the plurality of flue cavities form a flue gas channel that zigzags multiple times; and the plurality of flue cavities are respectively provided with a conversion reaction module (2), a steam generation and superheating module (3) and a medium temperature shift module (4), thus forming a conversion unit, a steam generation unit and a shift unit sequentially arranged along an advancing direction of the combustion flue gas;

wherein the conversion reaction module (2) comprises a first-stage conversion module (2-1), a second-stage conversion module (2-2) and a heat-exchange conversion module (2-3); and the conversion unit is further partitioned by high-temperature partition plates to form a first secondary flue cavity (1-1) for accommodating the first-stage conversion module (2-1), a second secondary flue cavity (1-2) for accommodating the second-stage conversion module (2-2) and a third secondary flue cavity (1-3) for accommodating the heat-exchange conversion module (2-3), and the first secondary flue cavity (1-1), the second secondary flue cavity (1-2) and the third secondary flue cavity (1-3) are communicated to form the flue gas channel that zigzags multiple times.

\* \* \* \* \*